(12) United States Patent
Kim et al.

(10) Patent No.: US 9,760,780 B2
(45) Date of Patent: Sep. 12, 2017

(54) THUMBNAIL MANAGEMENT (71) Applicant: KT Corporation, Seongnam-si, Gyeonggi-do (KR)

(72) Inventors: Jongsung Kim, Suwon-si (KR); Jae Cheol Kwon, Sejong-si (KR); Il-Hyeon Mun, Seoul (KR)

(73) Assignee: KT CORPORATION, Seongnam-si, Gyeonggi-Do (KR)

( * ) Notice: Subject to any disclaimer, the term of this patent is extended or adjusted under 35 U.S.C. 154(b) by 58 days.

(21) Appl. No.: 14/884,923

(22) Filed: Oct. 16, 2015

(65) Prior Publication Data
US 2016/0117559 A1 Apr. 28, 2016

(30) Foreign Application Priority Data

Oct. 17, 2014 (KR) .................. 10-2014-0140887

(51) Int. Cl.
H04N 9/80 (2006.01)
G06K 9/00 (2006.01)
H04N 5/14 (2006.01)
H04N 21/234 (2011.01)
H04N 21/2343 (2011.01)
H04N 21/472 (2011.01)
H04N 21/845 (2011.01)
G06F 17/30 (2006.01)

(52) U.S. Cl.
CPC ... *G06K 9/00751* (2013.01); *G06F 17/30793* (2013.01); *H04N 5/147* (2013.01); *H04N 21/23418* (2013.01); *H04N 21/234363* (2013.01); *H04N 21/47217* (2013.01); *H04N 21/8456* (2013.01)

(58) Field of Classification Search
CPC .......... G06K 9/00765; G06K 9/00228; G06K 9/00597; G06K 9/00281; G06K 9/00744; H04N 21/84
USPC ........ 386/241, 239, 248, 278, 281, 282, 286
See application file for complete search history.

(56) References Cited

U.S. PATENT DOCUMENTS

2008/0260348 A1* 10/2008 Maeda ................ G11B 27/034
386/279

FOREIGN PATENT DOCUMENTS

| KR | 10-2005-0043354 A | 5/2005 |
| KR | 10-0952382 B1 | 4/2010 |
| KR | 10-1124560 B1 | 3/2012 |

* cited by examiner

Primary Examiner — Robert Chevalier
(74) Attorney, Agent, or Firm — Brundidge & Stanger, P.C.

(57) ABSTRACT

Thumbnail management for video content may include detecting scene change points from video content, prioritizing each frame in each analysis window, selecting a frame in each analysis window based on a respective prioritization score for each frame, and storing the selected frame as the thumbnail for the respective analysis window.

18 Claims, 10 Drawing Sheets

THUMBNAIL MANAGEMENT

BACKGROUND

A thumbnail refers to reduced-sized versions of an image or representation of a video that has been extracted to represent at least portions of a video. As a representation of at least portions of a video, a user can peruse the contents of the video.

SUMMARY

In one example embodiment, a method of selecting thumbnails corresponding to video content includes detecting a plurality of scene change points from the video content, determining a number of analysis windows based on at least one of a required number of thumbnails or the plurality of detected scene change points; prioritizing each frame in each of the analysis windows, selecting a frame in each of the analysis windows based on a respective priority, and storing the selected frame as the thumbnail for the respective analysis window.

In another example embodiment, a device of selecting thumbnails of video content, comprising: a detector configured to detect a plurality of scene change points from the video content; an analysis window manager configured to determine a number of analysis windows based on at least one of a required number of thumbnails or the plurality of detected scene change points; a priority manager configured to prioritize each frame included in each of the analysis windows; a frame selector configured to select a frame in each of the analysis windows based on a respective priority; and a database configured to store the selected frame as the thumbnail for the respective analysis window.

In yet another example embodiment, a system of providing thumbnails of a video content, comprising: a video content provision server; and a user device, and wherein the video content provision server is configured to: detect a plurality of scene change points from the video content, determine a number of analysis windows based on at least one of a required number of thumbnails or the plurality of detected scene change points, prioritize each frame included in each of the analysis windows, select a frame in each of the analysis windows based on the respective priority, and store the selected frame as one of the thumbnails, and the user device is configured to: receive the video content and the thumbnails from the video content provision server, and display the video content and the thumbnails.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

The example embodiments described herein pertain to methods, programs, applications, systems, and apparatuses for extracting video thumbnails. Accordingly, the examples described herein pertain to extracting high-quality video thumbnails, thus enabling a user to easily identify corresponding video content.

Figure 1:
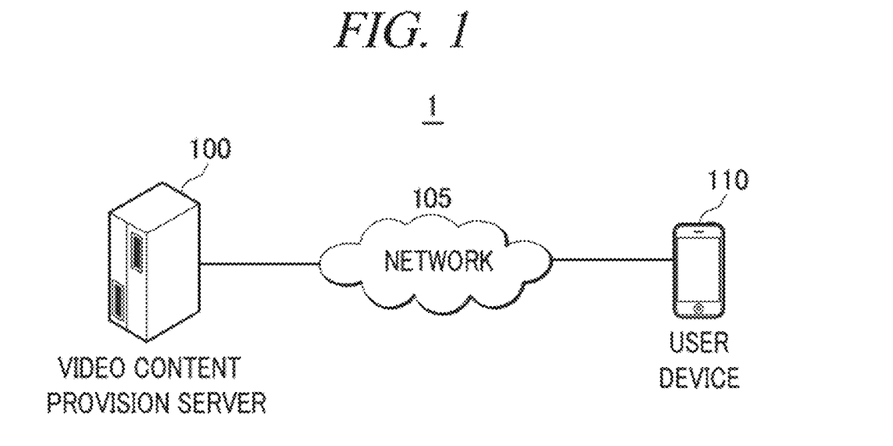
FIG. 1 shows a configuration of a thumbnail management system, in accordance with examples described herein.

FIG. 1 shows a configuration of a thumbnail management system, in accordance with examples described herein. As depicted, configuration 1 includes, at least, video content provision server 100, network 105; and user device 110.

Video content provision server 100 may be configured, programmed, and/or designed extract a video thumbnail; or, alternatively, to host, store, and/or executive an instance of a video thumbnail extracting apparatus. The video thumbnail extracting apparatus may provide a user with a thumbnail for effective browsing.

Video content provision server 100 may be configured, programmed, and/or designed to detect one or more scene change points of a video; determine a number of analysis windows to be implemented for the video based on the number of thumbnails to be extracted and the detected scene change points; prioritize frames detected in each analysis window; select one of the multiple frames included in each analysis window based on the respective priority of the frame, and store the selected frame as a thumbnail. Also, the video providing server 100 may transmit the thumbnail and the video to the user terminal 110.

As referenced herein, an analysis window may refer to at a portion of a video in which at least one scene change point is detected. In each analysis window, the still frame images may be analyzed to identify the highest quality thumbnail, relative to the other still frame images in the analysis window.

As referenced herein, a scene change point may refer to a still frame image, i.e., frame, within a video identified using one or more of a histogram, an inter-block mean value, a variance value, and a pixel difference value that, from one frame to another, meets or exceeds a threshold value.

As referenced herein, a video may refer to a full-length movie, television program, or other media program that may be transmitted, streamed, or stored in a known video format.

Network 105 may include, but not be limited to, a broadcast network for television programming. Such broadcasting may be implemented utilizing radio-wave transmissions for video signals, cable television network, e.g., coaxial cables, direct-broadcast satellite network, etc., utilized for broadcasting electronic media to public or subscription based audiences. Thus, network 105 may additionally or alternatively include a computer network, the Internet, a telephone network, a TCT/IP data network (wide area networks, metropolitan area networks, local area networks, campus area networks, virtual private networks), and any other processing and/or computing devices capable of providing at least server-to-client communications.

User terminal 110 may receive the thumbnail and the video from server 100, and display the thumbnail while playing the video. That is, user terminal 110 may refer to an electronic device that is configured to receive analog and/or digital media content from server 110 over network 105, as described below. Terminal 110 may also be implemented as a television set-top box, a smart TV, a personal computer, a tablet computing device, or a laptop computer. Additionally or alternatively, terminal 110 may be implemented as a portion of a small-form factor portable (or mobile) electronic device such as a mobile phone, cell phone, smartphone, personal data assistant (PDA), a personal media player device, an application specific device, or a hybrid device that include any of the above functions.

Figure 2:
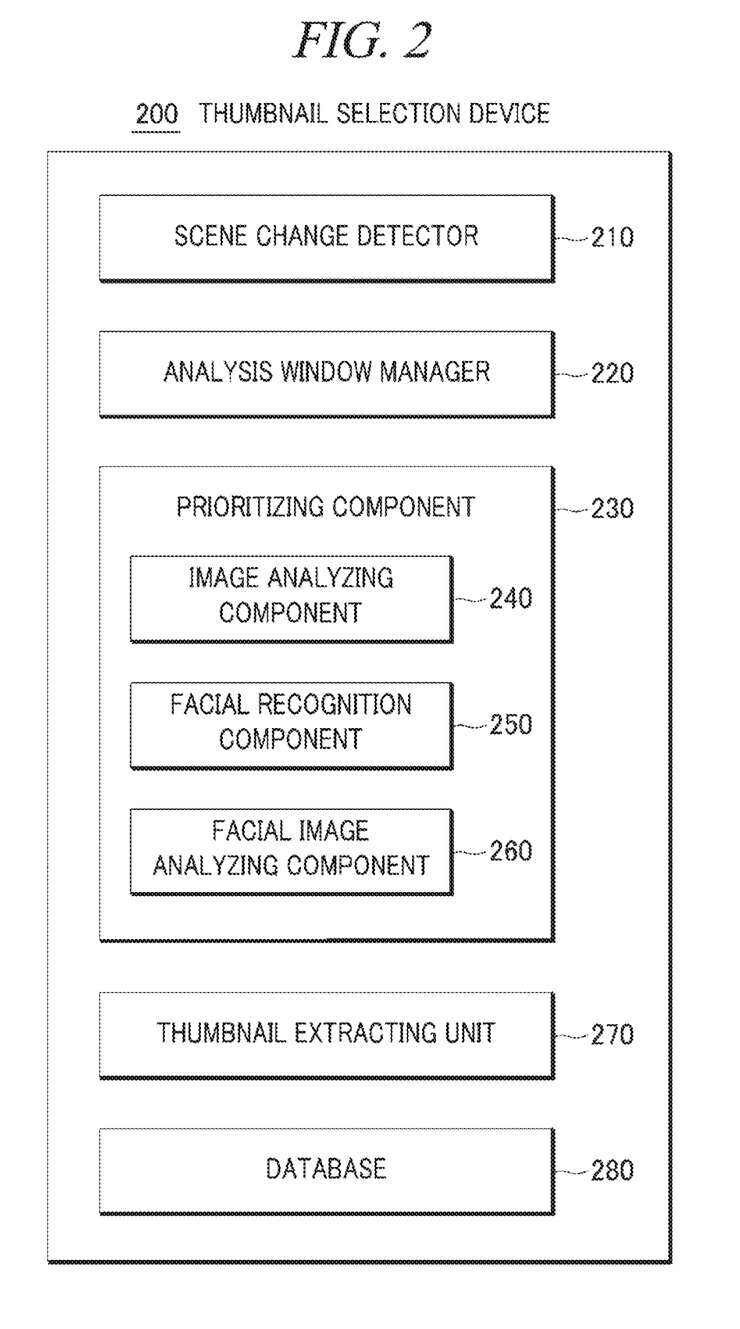
FIG. 2 shows a block diagram of a thumbnail management device, in accordance with examples described herein.

FIG. 2 shows a block diagram of a thumbnail selection device 200, in accordance with examples described herein. Thumbnail selection device 200 may be hosted and implemented, at least in part, by video content provision server 100. By way of example, thumbnail selection device 200, which may alternatively be implemented as a programmable application, may reside on a memory device of a server or combination of servers. Thumbnail selection device 200 may include scene change detector 210, analysis window manager 220, prioritizing component 230, image analyzing component 240, facial recognition component 250, facial image analyzing component 260, a thumbnail extracting unit 270 and a database 280. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. These components may be implemented in a computing environment relative to video content provision server 100, and may be stored in a corresponding memory storage device. For purposes of illustration, the application or program, including executable program components, corresponding to thumbnail selection device 200 are illustrated herein as discrete blocks, although it is recognized that such programs and components reside at various times in different storage components of the corresponding client device, and may be executed by at least one data processor of the computer.

The thumbnail selection device 200 may be configured, programmed, and/or designed to extract a thumbnail for a video by using the components described below.

Scene change detector 210 may be configured, programmed, and/or designed to detect one or more scene change points in an entire video section. For example, the scene change detector 210 may detect a scene change point by detecting a frame including a scene change point by using one or more of histograms between adjacent frames, a difference in mean values between corresponding blocks of adjacent frames, a difference in variance values between corresponding blocks of adjacent frames, and a difference in pixel values between corresponding blocks of adjacent frames.

Analysis window manager 220 may be configured to divide the video into a number of analysis windows in accordance with the number of thumbnails to be extracted. The analysis window manager 220 may be configured establish a series of uniform analysis windows. For example, the analysis window manager 220 may divide a video into a series of analysis windows that are equal in length, in terms of any one or more of, e.g., time, file size, scene changes, etc. For example, the analysis window manager 220 may divide a video, according to the number of thumbnails necessary to be extracted, into portions that are of equal length, e.g., 5 seconds, 1 minute, 10 minutes, etc.

As an alternative example, analysis window manager 220 may divide a video into a series of analysis windows based on scenes indicated in metadata of the video.

As yet another example, analysis window manager 220 may be configured, programmed, and/or designed to establish a series of analysis windows based on frames that each include at least one detected scene change points. For example, the analysis window manager 220 may set an analysis window to include at least one frame including a scene change point. Thus, analysis window manager 220 may server to minimize a region in which frames are analyzed for prioritization.

Prioritizing component 230 may include the image analyzing unit 240, facial recognition component 250, and facial image analyzing unit 260. Thus, prioritization, as an index for extracting a thumbnail, may be based on, e.g., clarity value of an image in a frame, which itself may be based on whether a face has been detected in a respective frame within an analysis window and whether at least one of eye on a detected face in the frame is open or closed.

Image analyzing unit 240 may be configured, designed, and/or programmed to measure clarity value for the multiple frames. For example, image analyzing unit 240 may measure clarity value of multiple frames within an analysis window based on frequency components and statistical characteristics (variance and a correlation coefficient, etc.) of frames therein. Alternatively, image analysis unit 240 may measure clarity value for the multiple frames by using a Brenner gradient, which is a macro to determine image focal quality.

Facial recognition component 250 may be configured to scan each frame within an analysis window to detect at least one face therein.

For each face detected by facial recognition component 250 in a respective frame, facial image analyzing component 260 may be configured, programmed, and/or designed to identify the one or more eyes on the face and determine whether at least one of the eyes is open or closed.

Prioritizing component 230 may be configured, programmed, and/or designed to prioritize the multiple frames included in the analysis window. For example, prioritizing component 230 may determine a respective prioritization score for each frame based on a score calculated by applying a weight for at least one prioritizing parameter, including, but not limited to, clarity value of an image, whether a face is detected within a respective frame, and whether at least one of the eyes on a detected face are open or closed. Formula 1 below is an example for calculation of the prioritization score.

Prioritization score=(clarity value)*$Ws$+(whether a face has been detected in the respective frame) *$Wf$+(whether eyes for a detected face are closed)*$We$

*$Ws$: Weight value for clarity value

*$Wf$: Weight value for whether a face has been detected. Thus, a respective frame will be given a higher prioritization score if at least one face has been detected in the frame.

*$We$: Weight value for whether both eyes on the detected face are closed. Thus, a respective frame will be given an even higher prioritization score if at least one eye on the detected face in the frame is open.

Thumbnail extracting unit 270 may be configured to select one of the multiple frames included in a respective analysis window based on the determined prioritization score. Accordingly, the thumbnail extracting unit 270 may select a frame having a highest prioritization score in a respective analysis window as a thumbnail.

Database 280 may be configured to store time-stamp information for frames in respective analysis windows, as well as time-stamp information for the scene change points therein. Also, the database 280 may be configured to store selected frame as a thumbnail for a respective analysis window based on the respective prioritization score.

Figure 3:
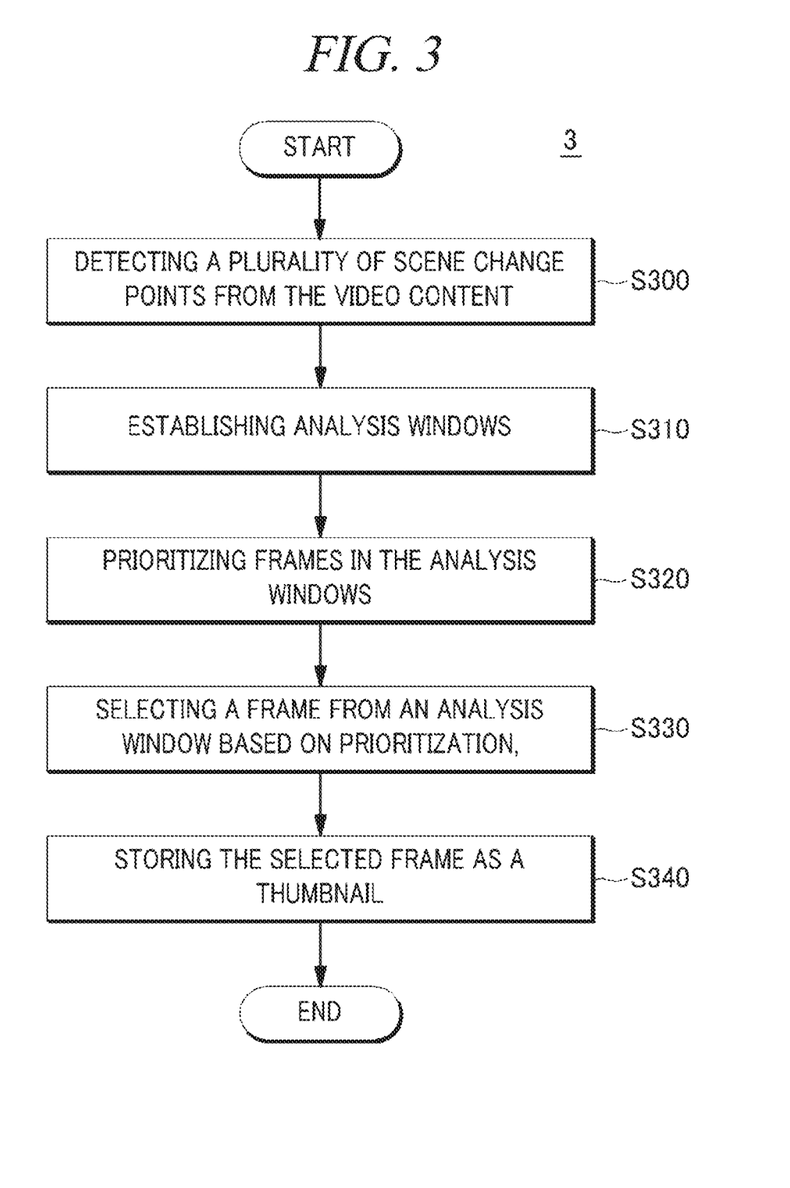
FIG. 3 shows a data flow for implementing at least one other aspect of thumbnail management, in accordance with examples described herein.

FIG. 3 shows a data flow 3 for implementing at least one other aspect of thumbnail management, in accordance with examples described herein. Process 3 may be implemented by any of the embodiments and/or components thereof referenced previously in FIGS. 1 and 2. According to the description of the operations in FIG. 3, any of the operations depicted and described herein may be implemented as computer-readable instructions stored on a computer-readable medium. The computer-readable instructions may, for example, be executed by a processor of any one of video content provision server 100 and/or user device 115, as referenced herein, having a network element and/or any other device corresponding thereto, particularly as applicable to the applications and/or programs described above corresponding to the configuration 1 for thumbnail management. Example process 3 may include one or more operations, actions, or functions as illustrated by one or more blocks S300, S310, S320, S330, and S340. Although illustrated as discrete blocks, various blocks may be divided into additional blocks, combined into fewer blocks, or eliminated, depending on the desired implementation. Processing may begin at S300.

At S300 (detecting a plurality of scene change points from the video content), scene change detector 210 detects one or more scene change points of a video.

At S310 (establishing analysis windows), analysis window manager 220 may divide at least a portion of a video into a number of analysis windows based on a number of thumbnails to be extracted, which may correspond to a number of scene change points in the given portion of video.

At S320 (prioritizing frames in the analysis windows), prioritizing component 230 may prioritize the multiple frames included in the one or more analysis windows, e.g., utilizing the prioritization scoring formula described above.

At S330 (selecting a frame from an analysis window based on prioritization), thumbnail extracting unit 270 selects one of the multiple frames included in the analysis window based on the respective prioritization score.

At S340 (storing the selected frame as a thumbnail), thumbnail extracting unit 270 further stores the selected frame as a thumbnail.

Each stored thumbnail may be further transmitted, via network 105, to user device 110, at which the respective thumbnails may serve as active links to the video. More particularly, the active links may serve as active links to the entire video or to portions of the video. As an active link to the entire video, the respective thumbnails, when activated on user device 110, may cause server 100 to transmit or stream the entire video to user device 110, via network 105. As an active link to a portion of the video, the respective thumbnails, when activated on user device 110, may server 100 to transmit or stream the portions of the video, within the analysis window to which the respective thumbnail corresponds, to user device 110, via network 105.

Figure 4:
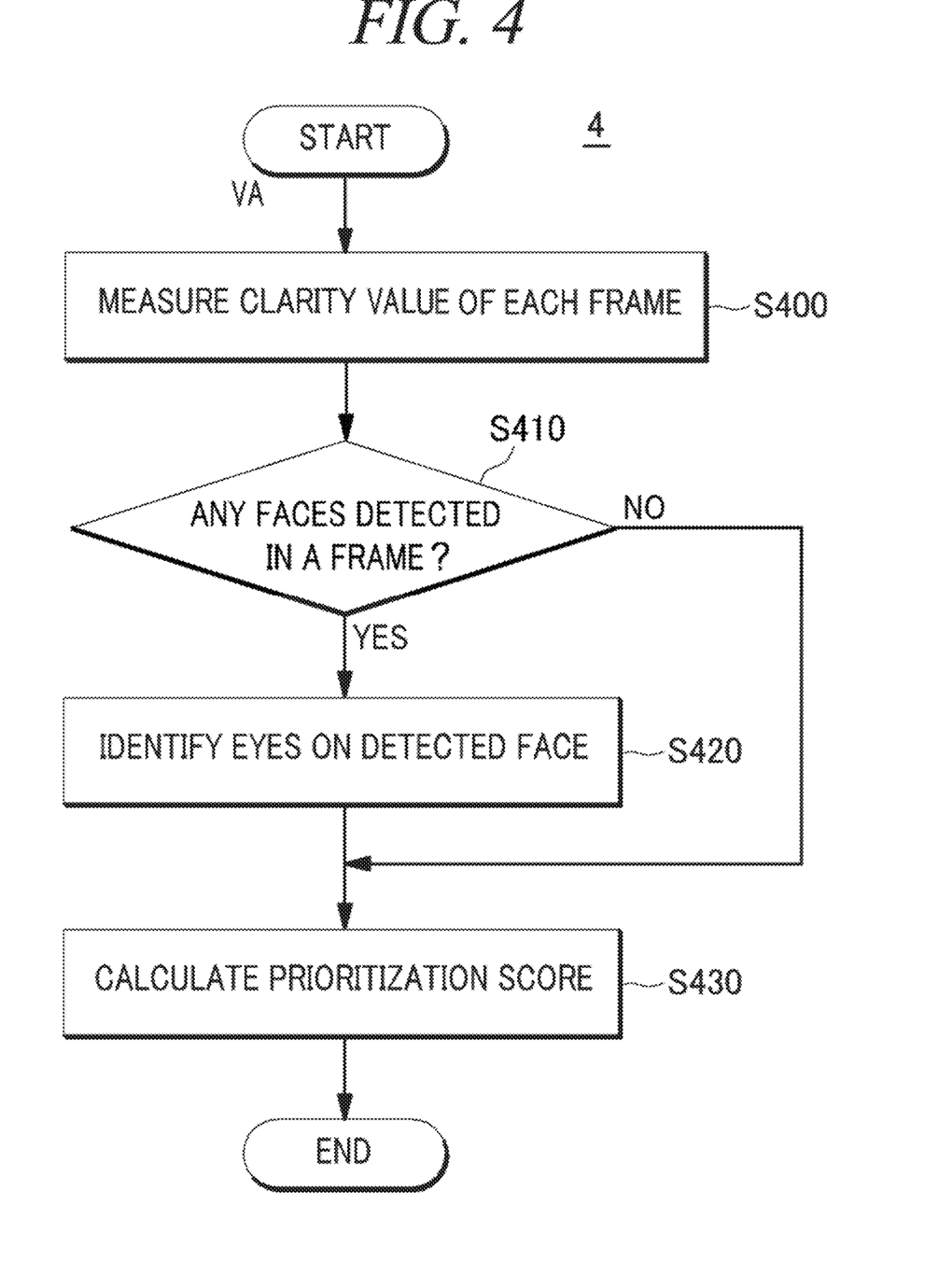
FIG. 4 shows another data flow for implementing at least one aspect of thumbnail management, in accordance with examples described herein.

FIG. 4 shows another data flow 4 for implementing at least one aspect of thumbnail management, in accordance with examples described herein. Process 4 may be implemented by any of the embodiments and/or components thereof referenced previously in FIGS. 1-3. According to the description of the operations in FIG. 4, any of the operations depicted and described herein may be implemented as computer-readable instructions stored on a computer-readable medium. The computer-readable instructions may, for example, be executed by a processor of any one of video content provision server 100 and/or user device 115, as referenced herein, having a network element and/or any other device corresponding thereto, particularly as applicable to the applications and/or programs described above corresponding to the configuration 1 for thumbnail management. Example process 4 may include one or more operations, actions, or functions as illustrated by one or more blocks S400, S410, S420, and S430. Although illustrated as discrete blocks, various blocks may be divided into additional blocks, combined into fewer blocks, or eliminated, depending on the desired implementation. Processing may begin at S400.

At S400 (measure clarity value of each frame), image analyzing unit 240 measures clarity value for the multiple frames within an analysis window.

At S410 (any faces detected in a frame?), facial recognition component 250 may scan each frame within an analysis window to detect at least one face therein.

At S420 (identify eyes on detected face), if the face area has been detected, facial image analyzing component 260 may scan the face to determine whether at least one of the eyes is open or closed.

Figure 5:
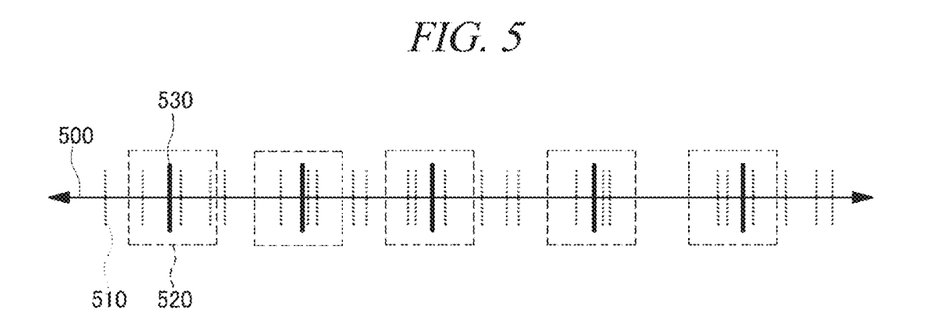
FIG. 5 shows a schematic depiction of thumbnail management, as referenced in examples described herein.

At S430 (calculate prioritization score), prioritizing component 230 may determine a respective prioritization score for each frame within a particular analysis window based on a score calculated by applying a weight for at least one prioritizing parameter, including, but not limited to, clarity value of an image, whether a face is detected within a respective frame, and whether at least one of the eyes on a detected face are open or closed FIG. 5 shows a schematic depiction of thumbnail management, as referenced in examples described herein. More particularly, FIG. 5 shows an example series of analysis windows in accordance with an example embodiment. Referring to FIG. 5, an entire video section 500 may include a scene change point 510, and a pre-set division point 520 within analysis window 530.

Scene change point 510 may be detected by scene change detector 210, and detected every time a scene changes in the entire video section 500. As an example, scene change point 510, indicated by a dotted line, may be sporadically present in the entire video section 500.

Pre-set division point 520 corresponds to one of a series of points at which video section 500 is equally divided by a manager into a preset number of sections. For example, referring to FIG. 5 video section 500 may be divided into six (6) preset sections to include five (5) equally spaced division points 520.

Analysis window 530 may be set based on the number of thumbnails necessary to be extracted. For example, five (5) thumbnails are wanted, five (5) analysis windows 530 may be provided for the entire video section 500. Analysis window 530 may be established based on scene change point 510. For example, the analysis window 530 may include at least one frame including the scene change point 510. Referring to FIG. 5, each analysis window 530 may include three (3) scene change points 510. In addition or alternatively, analysis windows 530 may be established based on the preset equally spaced division point 520. For example, the analysis window 530 may include at least one preset equally spaced division point for video 500.

Figure 6:
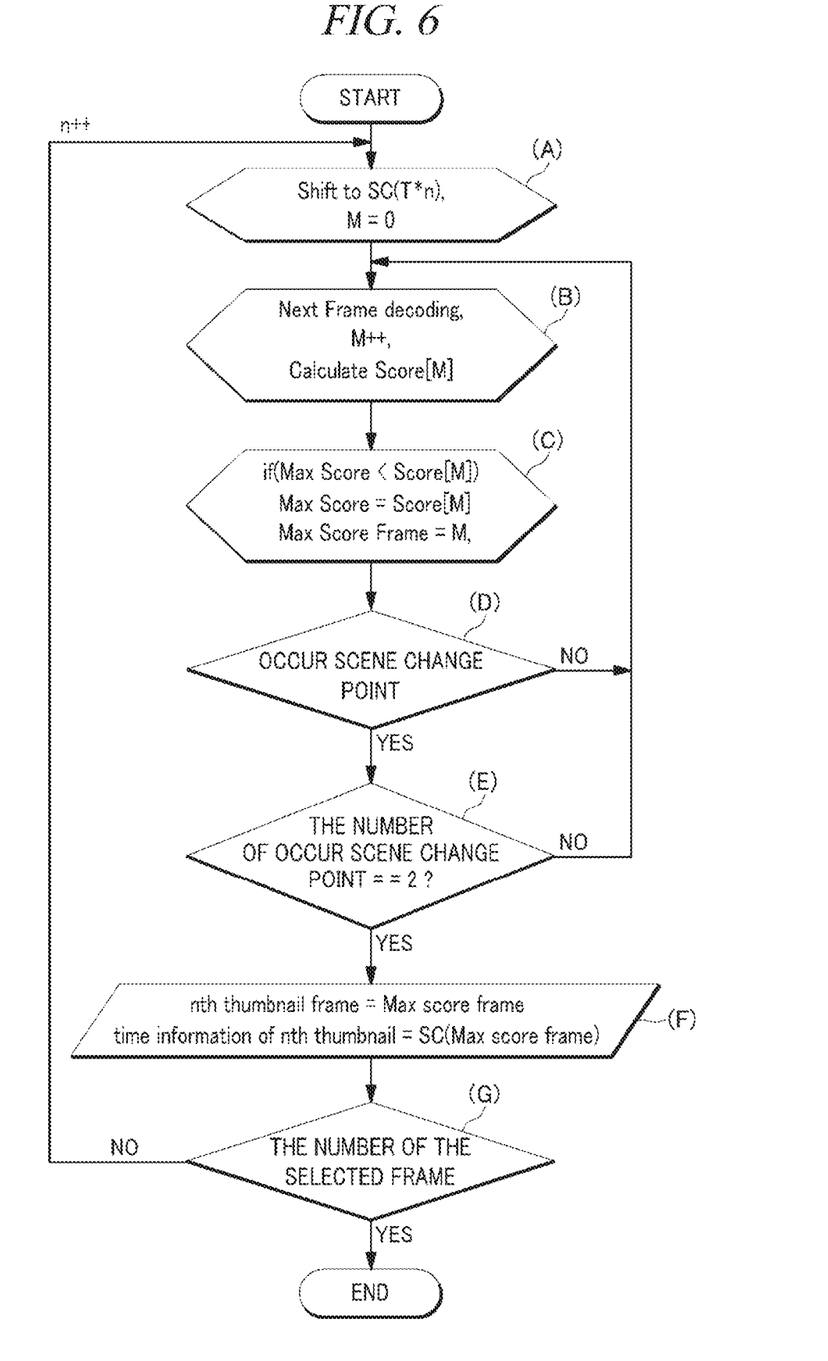
FIG. 6 shows a prioritization analysis for implementing at least one other aspect of thumbnail management, in accordance with example embodiments described herein.

FIG. 6 shows prioritization analysis for implementing at least one other aspect of thumbnail management, in accordance with example embodiments described herein.

T refers to dividing an entire video by the number of thumbnails to be extracted. The number of thumbnails to be extracted may be manually or automatically determined based on, e.g., length of the entire video, default processing time for an analysis window, user choice, etc. n may refer to an order of current extracted thumbnails; and SC(X) may refer to a start time for a respective scene change, to which a $X^{th}$ frame belongs.

At (A) one or more analysis windows are established by dividing an entire video input according to the number of thumbnails to be extracted, beginning at a start point (SC (T*n)) of a scene change point, to which the corresponding time belongs. M, which refers to a frame order within the corresponding analysis window, is initiated to zero.

At (B), M increases, and prioritization for each frame in the analysis window is scored, and Score (M) is calculated by using the following formula:

Score ($M$)=(clarity value)*$Ws$+(whether a face has been detected in the respective frame)*$Wf$+ (whether eyes for a detected face are closed) *$We$, for which:

Ws: Weight value for clarity value
Wf: Weight value for whether a face has been detected in the respective frame
We: Weight value for whether eyes for a detected face are closed At (C), if the score (M) exceeds a threshold value, the score (M) is stored in a max score, and the corresponding frame is stored in a max score frame.

At (D), each frame in an analysis window is scanned for at least one scene change point. The process returns to (B) to extract a score (M) if no scene change point is detected.

If a scene change point has been detected, at (E) the scene change points for the corresponding analysis window are counted. For example, the analysis window may include at least one frame including a scene change point. In an example embodiment, each analysis window may include maximum two (2) scene change points. Accordingly, if two (2) scene change points are detected, the current $n^{th}$ thumbnail extracting process is finished.

At (F), a max score frame is stored at (C) in an $n^{th}$ thumbnail frame, and a SC (max score frame) is stored in $n^{th}$ thumbnail time information.

At (G), if the number of extracted thumbnails is the same as the number of thumbnails originally determined to be extracted, the process ends. If not, n is increased, and the process returns to (A).

Figure 7:
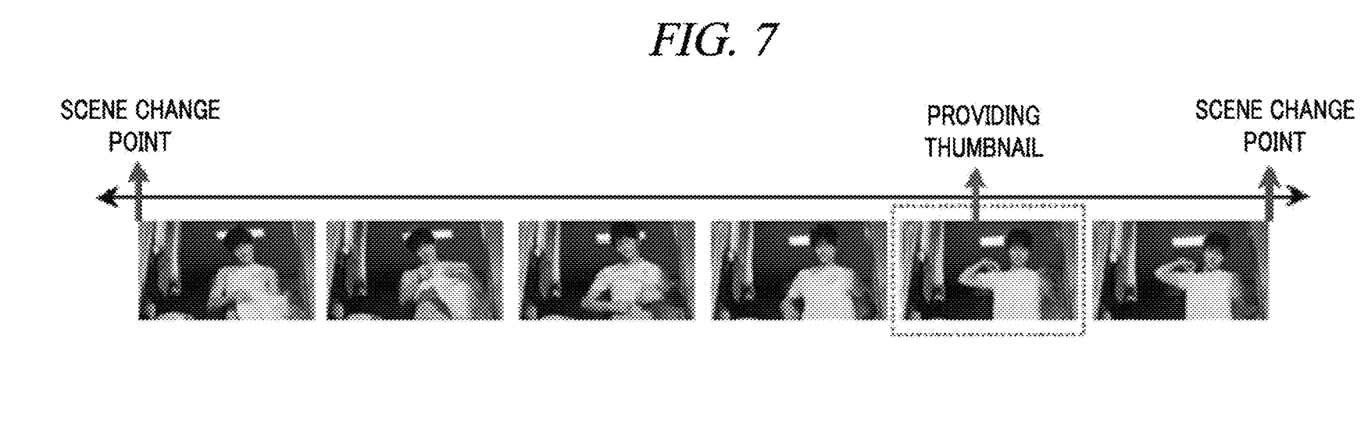
FIG. 7 shows a depiction of example results of thumbnail management, in accordance with example embodiments described herein.
Figure 8:
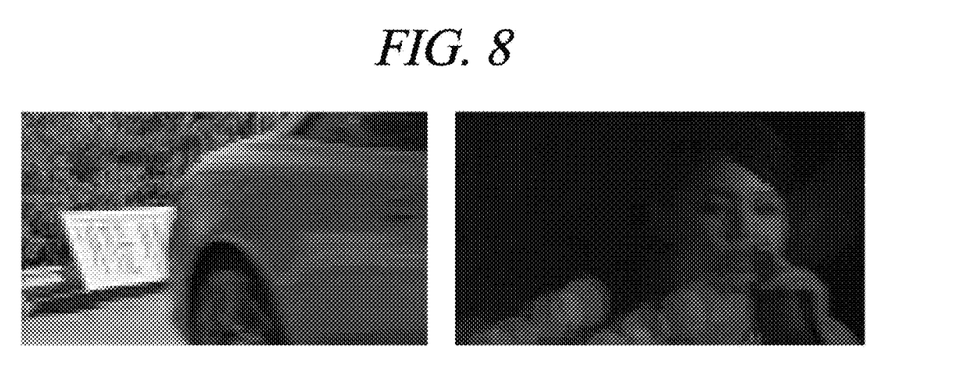
FIG. 8 shows another depiction of example results of thumbnail management, in accordance with example embodiments described herein.
Figure 9:
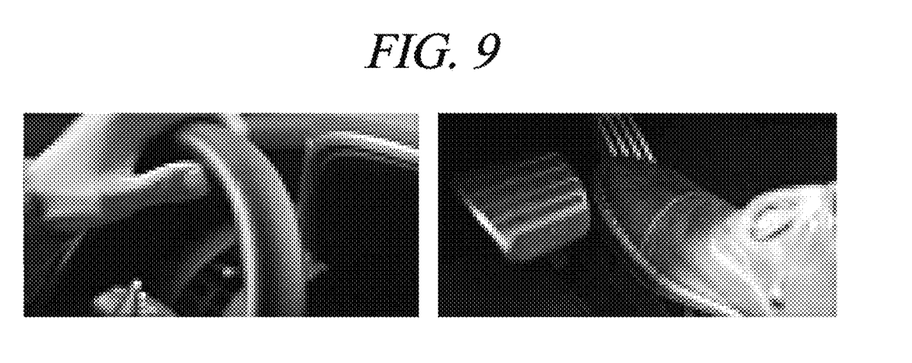
FIG. 9 shows yet another depiction of example results of thumbnail management , in accordance with example embodiments described herein.

FIGS. 7-9 show depictions of example results of thumbnail management, in accordance with example embodiments described herein.

Further, since the example embodiments extract a thumbnail based on whether a face area has been detected and whether eyes are closed, they can extract a frame, of which contents can be easily understood by a user, as a thumbnail, excluding meaningless frames, and thus, have the superior effect that is distinguishable from the conventional technology.

Figure 10:
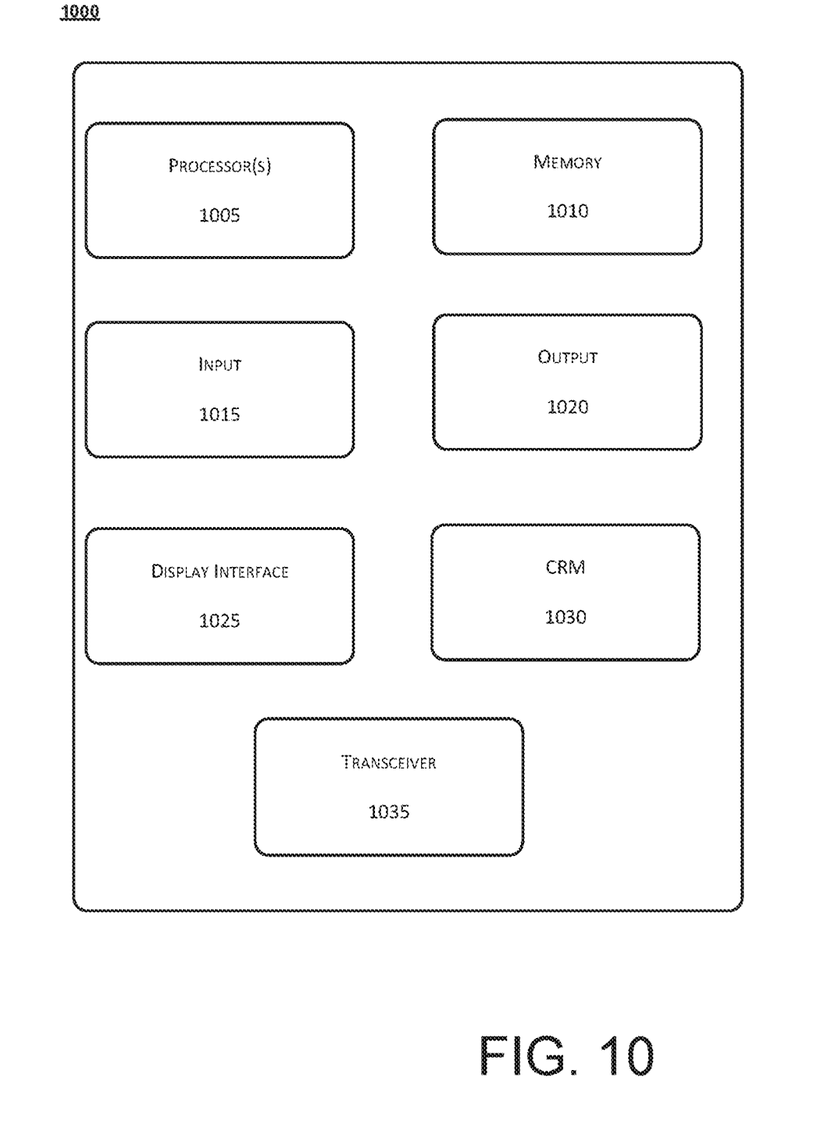
FIG. 10 shows an example computing device on which and by which at least portions of thumbnail may be implemented, arranged in accordance with one or more embodiments described herein.

FIG. 10 shows an illustrative computing embodiment, in which any of the processes and sub-processes of profile-based content variation may be implemented as computer-readable instructions stored on a computer-readable medium. The computer-readable instructions may, for example, be executed by a processor of any one of commerce channel commerce channel server 110 and/or television viewing device 115, as referenced herein, having a network element and/or any other device corresponding thereto, particularly as applicable to the applications and/or programs described above corresponding to the configuration 100 for thumbnail management.

In a very basic configuration, a computing device 1000 may typically include, at least, one or more processors 1005 and a system memory 1010. Computing device 500 may also include one or more input components 1015, one or more output components 1020, a display component 1025, a computer-readable medium 1030, and a transceiver 1035.

Processor(s) 1005 may refer to, e.g., a microprocessor, a microcontroller, a digital signal processor, or any combination thereof.

Memory 1010 may refer to, e.g., a volatile memory, non-volatile memory, or any combination thereof. Memory 1010 may store, therein, an operating system, an application, and/or program data. That is, memory 1010 may store executable instructions to implement any of the functions or operations described above and, therefore, memory 1010 may be regarded as a computer-readable medium.

Input component 1015 may refer to a built-in or communicatively coupled keyboard, touch screen, or telecommunication device. Further, an input component, if not built-in to computing device 1000, may be communicatively coupled thereto via short-range communication protocols including, but not limited to, radio frequency or Bluetooth.

Output component 1020 may refer to a component or module, which may be built-in or removable from computing device 1000, which is configured to output data to an external device.

Display component 1025 may refer to, e.g., a solid state display that may have touch input capabilities. That is, a display component may include capabilities that may be shared with or replace those of the aforementioned input components.

Computer-readable medium 1030 may refer to a separable machine readable medium that is configured to store one or more programs that embody any of the functions or operations described above. That is, a computer-readable medium, which may be received into or otherwise connected to a drive component of computing device 1000, may store executable instructions to implement any of the functions or operations described above. These instructions may be complimentary or otherwise independent of those stored by memory 1010.

Transceiver 1035 may refer to a network communication link for computing device 1000, configured as a wired network or direct-wired connection. Alternatively, a transceiver may be configured as a wireless connection, e.g., radio frequency (RF), infrared, Bluetooth, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method of selecting thumbnails corresponding to video content, comprising:
    detecting a plurality of scene change points from the video content;
    determining a number of analysis windows based on at least one of a required number of thumbnails or the plurality of detected scene change points;
    prioritizing each frame in each of the analysis windows;
    selecting a frame in each of the analysis windows based on a respective prioritization score for each frame; and
    storing the selected frame as the thumbnail for the respective analysis window.

2. The method of claim 1, wherein the detecting comprises,
    detecting the plurality of scene change points by using at least one of histograms between adjacent frames, a difference in mean values between corresponding blocks of adjacent frames, a difference in variance values between corresponding blocks of adjacent frames, and a difference in pixel values between corresponding blocks of adjacent frames.

3. The method of claim 1, wherein each analysis window includes at least one frame associated with one of the scene change points.

4. The method of claim 1, wherein each analysis window includes equal portions of the video content.

5. The method of claim 1, wherein the prioritizing comprises:
    measuring a clarity value of each frame included in each analysis window.

6. The method of claim 5, wherein the prioritizing further comprises:
    searching for a human face in each frame included in each analysis window.

7. The method of claim 6, wherein, when the searching for a human face in each frame comprises:
    detecting an eye in each human face found in a respective one of the frames, and
    determining whether the detected eye is open or closed.

8. The method of claim 7, wherein the respective prioritization score for each frame is determined based on a score calculated by applying a weight for each of the respectively measured clarity value, whether or not a human face is detected therein, and whether a detected eye is open or closed.

9. A device of selecting thumbnails of video content, comprising:
    a scene change detector configured to detect a plurality of scene change points from the video content;
    an analysis window manager configured to determine a number of analysis windows based on at least one of a required number of thumbnails or the plurality of detected scene change points;
    a prioritizing component configured to prioritize each frame included in each of the analysis windows;
    a thumbnail extracting unit configured to select a frame in each of the analysis windows based on a respective prioritization score for each frame; and
    a database configured to store the selected frame as the thumbnail for the respective analysis window.

10. The device of claim 9, wherein the scene change detector is configured to detect the plurality scene change points by using at least one of histograms between adjacent frames, a difference in mean values between corresponding blocks of adjacent frames, a difference in variance values between corresponding blocks of adjacent frames, and a difference in pixel values between corresponding blocks of adjacent frames.

11. The device of claim 9, wherein the analysis windows manager determines the number of analysis windows in accordance with the required number of the thumbnails.

12. The device of claim 9, wherein each analysis window includes at least one frame associated with one of the scene change points.

13. The device of claim 9, wherein each analysis window includes equal portions of the video content.

14. The device of claim 10, wherein the prioritizing component is configured to measure a clarity value of each frame included in each analysis window.

15. The device of claim 14, wherein the prioritizing component is configured to measure the clarity value for each frame by searching for at least one human face in each analysis window.

16. The device of claim 15, wherein, for each detected human face in a respective frame, the prioritizing component is configured to:
    detect an eye in each human face; and
    detect whether the eye is open or closed.

17. The device of claim 16, wherein the respective prioritization score for each frame is determined based on a score calculated by applying a weight for each of the respectively measured clarity values, whether or not a human face is detected therein, and whether a detected eye is open or closed.

18. A system of providing thumbnails of a video content, comprising:
    a video content provision server; and
    a user device, and
    wherein the video content provision server is configured to:
        detect a plurality of scene change points from the video content,
        determine a number of analysis windows based on at least one of a required number of thumbnails or the plurality of detected scene change points,
        prioritize each frame included in each of the analysis windows,
        select a frame in each of the analysis windows based on the respective prioritization score for each frame, and
        store the selected frame as one of the thumbnails, and the user device is configured to:

receive the video content and the thumbnails from the video content provision server, and
display the video content and the thumbnails.

* * * * *